(12) United States Patent
Kim et al.

(10) Patent No.: US 8,937,758 B2
(45) Date of Patent: Jan. 20, 2015

(54) ELECTROCHROMIC DISPLAY DEVICE

(71) Applicants: Sukchan Kim, Kanagawa (JP); Tohru Yashiro, Kanagawa (JP); Koh Fujimura, Tokyo (JP); Hiroyuki Takahashi, Kanagawa (JP); Shigenobu Hirano, Kanagawa (JP); Yoshihisa Naijo, Kanagawa (JP); Yoshinori Okada, Kanagawa (JP); Kazuaki Tsuji, Kanagawa (JP)

(72) Inventors: Sukchan Kim, Kanagawa (JP); Tohru Yashiro, Kanagawa (JP); Koh Fujimura, Tokyo (JP); Hiroyuki Takahashi, Kanagawa (JP); Shigenobu Hirano, Kanagawa (JP); Yoshihisa Naijo, Kanagawa (JP); Yoshinori Okada, Kanagawa (JP); Kazuaki Tsuji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 88 days.

(21) Appl. No.: 13/891,365

(22) Filed: May 10, 2013

(65) Prior Publication Data

US 2013/0335802 A1 Dec. 19, 2013

(30) Foreign Application Priority Data

May 11, 2012 (JP) .................................. 2012-109410
May 2, 2013 (JP) .................................. 2013-096912

(51) Int. Cl.
*G02F 1/153* (2006.01)
*G02F 1/155* (2006.01)
*G02F 1/163* (2006.01)

(52) U.S. Cl.
CPC ................ *G02F 1/155* (2013.01); *G02F 1/163* (2013.01)
USPC ........................................................ 359/273

(58) Field of Classification Search
CPC ........ G02F 1/1533; G02F 1/163; G02F 1/153

USPC ........................................................ 359/273
See application file for complete search history.

(56) References Cited

U.S. PATENT DOCUMENTS

| | | | |
|---|---|---|---|
| 6,301,038 | B1 | 10/2001 | Fitzmaurice et al. |
| 7,116,309 | B1 | 10/2006 | Kimura et al. |
| 7,333,259 | B2 | 2/2008 | Hirano et al. |
| 2011/0051221 | A1* | 3/2011 | Veerasamy .................... 359/275 |

FOREIGN PATENT DOCUMENTS

| | | |
|---|---|---|
| JP | 2000-292818 | 10/2000 |
| JP | 2003-121883 | 4/2003 |
| JP | 2003-270671 | 9/2003 |
| JP | 2004-151265 | 5/2004 |
| JP | 2006-106669 | 4/2006 |
| JP | 2007-171781 | 7/2007 |
| JP | 3955641 | 8/2007 |
| JP | 2008-116718 | 5/2008 |

* cited by examiner

*Primary Examiner* — Joseph P Martinez
(74) *Attorney, Agent, or Firm* — Cooper & Dunham LLP

(57) ABSTRACT

An electrochromic display device includes an electrochromic display element including a display electrode, an electrochromic layer provided on the display electrode, an opposing electrode facing the display electrode, and an electrolyte layer sandwiched between the display electrode and the opposing electrode. The electrochromic display device further includes a switching element, and a electric storage element. The display electrode is connected with the opposing electrode by a power source or the electric storage element via the switching element, and when performing driving, part of electric charges, which are stored in the electrochromic display element, are applied for charging the electric storage element, or electric charges in the electric storage element that has been charged are used for driving the electrochromic display element.

10 Claims, 15 Drawing Sheets

ELECTROCHROMIC DISPLAY DEVICE

BACKGROUND OF THE INVENTION

1. Field of the Invention

The present invention relates to an electrochromic display device.

2. Description of the Related Art

In recent years, development of electronic paper is actively taking place as an alternative electronic medium to paper. Electronic paper has a feature of using a display device as a paper, and therefore electronic paper is demanded to have features different from conventional display devices such as CRT and a liquid crystal display.

For example, electronic paper is demanded to have features such as being a reflective display device with a high white reflection ratio and a high contrast ratio, being able to display images with high precision, having a memory effect for the display, capable of being driven at low voltage, being thin and light, and being low-cost. Among these, there is particularly high demand to have the same white reflection ratio and the same contrast ratio as those of paper, as features relevant to the quality of the display.

In the past, as display devices using electronic paper, for example, a method of using a reflective liquid crystal, a method of using electrophoresis, and a method of using toner migration, have been proposed. However, with any of these methods, it has been very difficult to perform multicolor display while securing a white reflection ratio and a contrast ratio.

Generally, in order to perform multicolor display, a color filter is provided. However, when a color filter is provided, the color filter itself absorbs light, and the reflection ratio decreases. Furthermore, in a color filter, each pixel is divided into three colors of red (B), green (G), and blue (B), and therefore the reflection ratio of the display device decreases, which leads to a decrease in the contrast ratio. When the white reflection ratio and the contrast ratio decrease significantly, the legibility is drastically degraded, and therefore it is difficult to properly use the electronic paper.

Meanwhile, as a promising method for realizing a reflective display device without providing a color filter as described above, there is a method of using an electrochromic phenomenon.

A phenomenon in which voltage is applied to cause a reversible oxidation-reduction reaction and to reversibly change the color is referred to as electrochromism. An electrochromic display device uses the color-forming and color-erasing effects (hereinafter, "color forming/erasing") of an electrochromic compound which induces the electrochromism phenomenon. This electrochromic display device is capable of expressing colors by absorption of light, and has a memory effect. Therefore, research and development is taking place extensively as a promising candidate of the display device technology applicable to a reflective display using electronic paper, photochromic glass, photochromic lenses, etc., ranging from the development of materials to the design of the device.

However, the electrochromic display device has a shortcoming in that the response speed of color forming/erasing is slow, due to the principle that color forming/erasing is performed by using the oxidation-reduction reaction. Patent Document 1 discloses an example of an electrochromic display device in which the response speed of color forming/erasing is improved by fixing the electrochromic compound near the electrode. According to the description in Patent Document 1, the time required for color forming/erasing has been approximately 10 seconds in the conventional technology, but the time is reduced to approximately one second, both in terms of the time taken to form a blue color from a clear color and the time taken to erase the blue color to form a clear color. However, this is not sufficient. In the research and development of electrochromic display devices, there is a need to further increase the response speed of color forming/erasing.

Meanwhile, in an electrochromic display device, various colors can be formed by the structure of the electrochromic compound, and therefore there are high expectations to use the electrochromic display device as a multicolor display device.

There are several known examples of multicolor display devices using such an electrochromic display device. For example, Patent Document 2 discloses a multicolor display device using an electrochromic compound, in which particles of plural kinds of electrochromic compounds are laminated. Patent Document 2 discloses an example of a multicolor display device in which a multicolor display electrochromic compound is realized by laminating plural layers of electrochromic compounds which are highly-polymerized compounds having plural functional groups of different voltages that implement color forming.

Furthermore, Patent Document 3 discloses a display device in which multiple electrochromic layers are formed on an electrode, and multiple colors are formed by using the difference in voltage values and current values required for forming the respective colors. Patent Document 3 discloses an example of a multicolor display device which forms different colors, and which includes display layers formed by laminating or mixing plural electrochromic compounds having different threshold voltages for forming colors and different requisite electrical charge amounts required for forming colors.

Furthermore, Patent Document 4 discloses an example of a multicolor display device including a lamination of plural structure units. Each structure unit includes an electrochromic layer and an electrolyte being sandwiched between a pair of transparent electrodes. Furthermore, Patent Document 5 discloses an example of a multicolor display device in which a passive matrix panel and an active matrix panel are constituted by using the structure units described in Patent Document 4 to form the three colors of RGB.

Furthermore, Patent Document 6 discloses an example of an electrochromic display device, in which plural display electrodes are provided so as to be isolated from each other between a display substrate and an opposing electrode, plural electrochromic layers are provided in accordance with the plural display electrodes, and the electric resistance between one display electrode and another display electrode is made higher than the electric resistance of the one display electrode, to form a desired color.

However, the conventional electrochromic display device has the following problems.

For example, an electrochromic display device performs color forming/erasing by causing oxidization or a reductive reaction with electric charges supplied from the outside. Therefore, when a reductive color forming is caused for a certain pattern, the electrochromism material is in a reductive state according to the pattern. When erasing this pattern, the electrochromic display device is driven so as to cause oxidization color erasing with the same pattern used for forming the color, to erase the pattern that has been displayed. The same applies to the case of oxidization color forming and reduction color erasing. Furthermore, the color is formed in a stable state, and by supplying electric charges from the outside, the color is erased or a different color is formed.

The electrochromic display device has the above properties. Therefore, as the number of times of rewriting the pattern increases, the amount of electric charges supplied from the power source increases. Therefore, for example, when the electrochromic display device is used as a rewritable display device for reproducing a video, it is important to further reduce the consumption amount of electric charges when rewriting patterns.

Patent Document 1: Japanese National Publication of International Patent Application No. 2001-510590
Patent Document 2: Japanese Laid-Open Patent Publication No. 2003-121883
Patent Document 3: Japanese Laid-Open Patent Publication No. 2006-106669
Patent Document 4: Japanese Laid-Open Patent Publication No. 2003-270671
Patent Document 5: Japanese Laid-Open Patent Publication No. 2004-151265
Patent Document 6: Japanese Laid-Open Patent Publication No. 2000-292818

SUMMARY OF THE INVENTION

The present invention provides an electrochromic display device and a driving method thereof, in which one or more of the above-described disadvantages are eliminated.

A preferred embodiment of the present invention provides an electrochromic display device and a driving method thereof capable of suppressing the amount of electric charges supplied from a power source when switching between color forming and erasing in the electrochromic display device, with a simple configuration.

According to an aspect of the present invention, there is provided an electrochromic display device including an electrochromic display element including a display electrode, an electrochromic layer provided on the display electrode, an opposing electrode facing the display electrode, and an electrolyte layer sandwiched between the display electrode and the opposing electrode, the electrochromic display device further including a switching element, and a electric storage element, wherein the display electrode is connected with the opposing electrode by a power source or the electric storage element via the switching element, and when performing driving, part of electric charges, which are stored in the electrochromic display element, are applied for charging the electric storage element, or electric charges in the electric storage element that has been charged are used for driving the electrochromic display element.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
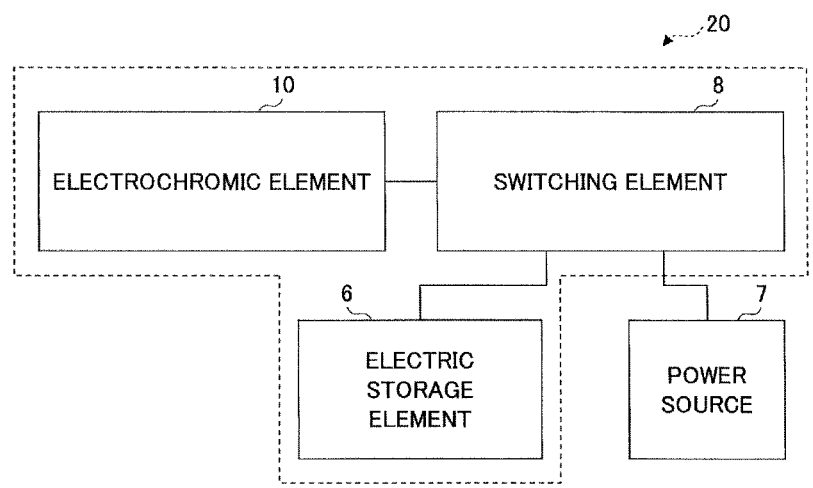
FIG. 1 is a block diagram of an example of an electrochromic display device.

An electrochromic display device according to an embodiment of the present invention includes an electrochromic display element 10 including a display electrode 1, an electrochromic layer 3 provided on the display electrode 1, an opposing electrode 2 facing the display electrode 1, and an electrolyte layer 4 sandwiched between the display electrode 1 and the opposing electrode 2; a switching element 8; and an electric storage element 6, wherein the display electrode 1 is connected with the opposing electrode 2 by a power source 7 or the electric storage element 6 via the switching element 8, and when performing driving, part of electric charges, which are stored in the electrochromic display element 10, are applied for charging the electric storage element 6, or the electric charges in the electric storage element 6 that has been charged are used for driving the electrochromic display element 10.

Next, a more detailed description is given of the electrochromic display device according to an embodiment of the present invention.

In the following embodiments, various limitations that are technically preferable are given because as these are preferable embodiments of the present invention. However, the scope of the present invention is not limited to the following embodiments unless otherwise described as limiting the present invention in the following.

FIG. 1 is a block diagram of an example of an electrochromic display device. This electrochromic display device is constituted by an electrochromic display element 10, an electric storage element 6, and a switching element 8. In FIG. 1, one of each of these elements is shown; however, the number of each element may be changed according to need.

Configuration of Electrochromic Display Device

Figure 2:
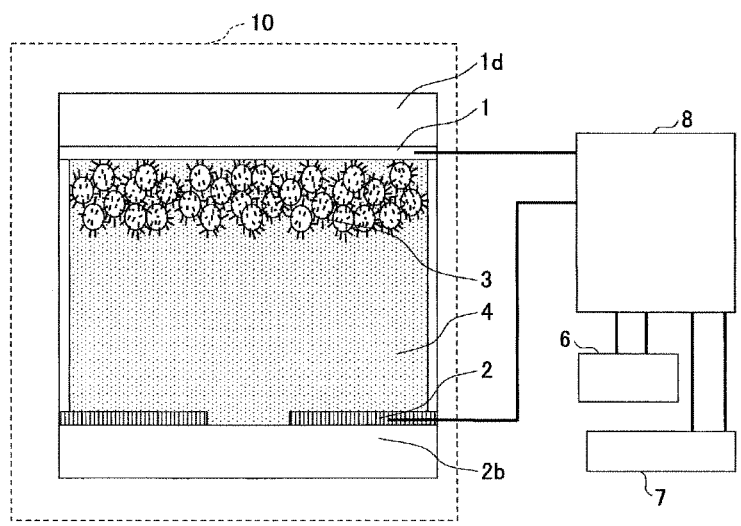
FIG. 2 is a cross-sectional view of a configuration example (1) of an electrochromic display device.

Next, a description is given of a configuration example (1) of the electrochromic display device. FIG. 2 is a schematic diagram of the electrochromic display device. As shown in FIG. 2, an electrochromic display element 10 includes a display electrode 1 and an electrochromic layer 3, and an opposing electrode 2 provided on the other side, which are adhered together via an electrolyte layer 4.

In the electrochromic display element 10, when causing the electrochromic layer 3 to form a color, a switching element 8 is used to connect the power source 7 to the display electrode 1 and the opposing electrode 2 and a voltage is applied, so that electric charges are supplied to the electrochromic layer 3. Accordingly, an oxidization reaction or a reductive reaction is caused in the electrochromic layer 3, so that a color can be formed in the electrochromic display element 10.

Conversely, when a color is erased at the electrochromic layer 3 of the electrochromic display element 10, a voltage opposite to that used when forming a color is applied to the display electrode 1 and the opposing electrode 2, and electric charges are supplied from the power source 7. Accordingly, a reductive reaction or an oxidization reaction is caused at the electrochromic layer 3, and the color is erased in the electrochromic display element 10.

In order to perform the above color forming/erasing operation, in the conventional electrochromic display device, a large amount of power is consumed every time a color forming/erasing pattern is rewritten.

Therefore, the inventors of the present invention have conceived a configuration of an electrochromic display device for reducing the power consumption of an electrochromic display element by connecting the display electrode 1 and the opposing electrode 2 to the power source or the electric storage element 6 via the switching element 8, and applying part of the supplied electric charges for charging the electric storage element 6; and a configuration of an electrochromic display device for reducing the power consumption of an electrochromic display element by using the electric charges of the electric storage element 6 that has been charged for driving the electrochromic display element.

With reference to FIG. 2, a detailed description is given of the respective elements of the first embodiment. The display electrode 1 is an electrode for controlling the electric potential for the opposing electrode 2 and for forming and erasing colors at the electrochromic layer 3.

As a display substrate 1*d*, the material is not particularly limited, and a known material may be used. For example, a glass substrate and a plastic substrate may be used.

The material of the display electrode 1 is not particularly limited as long as the material is conductive. However, as light permeability needs to be secured, an electrode made of a transparent material is used. The material of the transparent electrode is not particularly limited, but indium oxide in which tin is doped (hereinafter, "ITO"), tin oxide in which fluorine is doped (hereinafter, "FTO"), and tin oxide in which antimony is doped (hereinafter, "ATO"), are preferably used.

The electrochromic layer 3 includes an electrochromic material. As an electrochromic material, a known electrochromic compound is used, such as that of a pigment system, a polymer system, a metal complex system, and a metal oxide system.

As an electrochromic compound of the pigment system and the polymer system, a low molecular system organic electrochromic compound such as that of an azobenzene system, an anthraquinone system, a diallylethene system, a dihydroprene system, a dipyridine system, a styryl system, a styryl spiropyran system, a spiro-oxazine system, a spirothiopyran system, a thioindigo system, a tetrathiafulvalene system, a terephthalic acid system, a triphenylmethane system, a triphenylamine system, a naphthopyran system, a viologen system, a pyrazoline system, a phenazine system, a phenylenediamine system, a phenoxazine system, a phenothiazine system, a phthalocyanine system, a fluoran system, a fulgide system, a benzopyran system, and a metallocene system; and a conductive high polymer compound such as polyaniline and polythiophene is used. Particularly, a viologen system compound or a dipyridine system compound is preferably included. These materials have a low color forming/erasing potential, and indicate a good color value. Among these materials, examples of a viologen system material are described in Japanese Patent No. 3955641 and Japanese Laid-Open Patent Publication No. 2007-171781, and examples of a dipyridine system material are described in Japanese Laid-Open Patent Publication No. 2007-171781 and Japanese Laid-Open Patent Publication No. 2008-116718.

Examples of compounds of a metal complex system are an iron cyano complex system, a ruthenium cyano complex system, an osmium cyano complex system, a tungsten oxalate complex system, and a rare earth diphthalocyanine complex system.

Examples of compounds of a metal oxide system are tungsten oxide, molybdenum oxide, iridium oxide, indium oxide, titanium oxide, nickel oxide, and vanadium oxide.

Furthermore, as the electrochromic layer 3, as shown in FIG. 2, a structure including conductive or semiconductive particles carrying organic electrochromic compounds is preferable. Specifically, in the structure, ultrafine particles having a particle size of approximately 5 nm through 50 nm are sintered on the electrode surface, and on the surface of the ultrafine particles, organic electrochromic compounds having a polar group such as phosphonic acid, a carboxyl group, and a silanol group are adsorbed. With this structure, a large surface area effect of the ultrafine particles is used to effectively supply the electrons in the organic electrochromic compounds, and therefore the color forming density is high and the color erasing speed is high. Furthermore, by using ultrafine particles, a transparent film is formed as the display layer, and therefore a high white reflection ratio can be attained. Furthermore, plural kinds of organic electrochromic compounds may be carried by the conductive or semiconductive particles.

The conductive or semiconductive particles are not particular limited, but metal oxide is preferable.

As the materials of the metal oxide, titanium oxide, zinc oxide, tin oxide, zirconium oxide, cerium oxide, yttrium oxide, boric oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, and calcium phosphate are used as the main components. These metal oxides may be used alone or two or more of these metal oxides may be mixed together. In view of electrical properties such as electric conductivity and physical properties such as optical properties, when one or a mixture of elements chosen from titanium oxide, zinc oxide, tin oxide, zirconium oxide, iron oxide, magnesium oxide, indium oxide, tungsten oxide is used, color forming/erasing can be performed with a high response speed. In particular, when titanium oxide is used, color forming/erasing can be performed with an even higher response speed.

Furthermore, the shape of the conductive or semiconductive particles is not particularly limited; however, in order to efficiently carry the electrochromic compound, particles having a large surface area per unit volume (hereinafter, "specific surface area") are used. For example, when the particles are a collection of nano particles, the particles have a large specific surface area, and therefore the electrochromic compounds are carried even more efficiently, so that color forming/erasing can be performed with a high display contrast ratio.

The opposing electrode 2 is an electrode for controlling the potential of the display electrode 1 with respect to the opposing electrode 2 and causing the electrochromic layer 3 to form a color. The opposing electrode 2 is preferably constituted by plural electrodes. Furthermore, each opposing electrode 2 is preferably electrically connected to the power source 7 or the electric storage element 6 via the switching element 8. The material of the opposing electrode 2 is not particularly limited as long as the material is conductive. Examples are ITO, FTO, a transparent conductive film such as zinc oxide, or a conductive metal film such as zinc and platinum, or carbon.

The electrolyte layer 4 moves the electric charges by moving the ions between the display electrode 1 and the opposing electrode 2, and causes the color forming/erasing reaction of the electrochromic layer 3.

Examples of the electrolyte material are inorganic ionic salt such as alkali metal salt and alkaline-earth metal salt; and supporting salt such as quaternary ammonium salt, acid, and alkali.

Specific examples are $LiClO_4$, $LiBF$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

Furthermore, ionic liquid may be used. Particularly, an organic ionic liquid has a molecular structure indicating a liquid in a wide temperature range including room temperature.

Examples of the molecular structure are, as the cationic component, imidazole derivatives such as N,N-dimethyl imidazole salt, N,N-methylethyl imidazole salt, and N,N-methylpropyl imidazole salt; salt of the aromatic system such as pyridinium derivatives such as N,N-dimethylpyridinium salt and N,N-methylpropyl pyridinium salt; or aliphatic quaternary ammonium such as tetraalkylammonium such as trimethyl propyl ammonium salt, trimethyl hexyl ammonium salt, and triethyl hexyl ammonium salt. As the anion component, a compound including fluorine is preferable in terms of stability in the atmosphere, such as $BF_4^-$, $CF_3SO_3^-$, $PF_4^-$, and $(CF_3SO_2)_2N^-$. An ionic liquid may be used, which is formulated by a combination of these cationic components and anion components.

These electrolyte materials may be dissolved with the use of a solvent, and may be used as an electrolysis solution in the electrolyte layer 4.

Examples of the solvent are propylene carbonate, acetonitrile, γ-butyrolactone, ethylene carbonate, sulfolane, dioxolan, tetrahydrofuran, 2-methyltetrahydrofuran, dimethylsulfoxide, 1, 2-dimethoxyethane, 1,2-ethoxymethoxyethane, polyethyleneglycol, alcohol, and a mixed solvent thereof.

Furthermore, the electrolysis solution need not be a liquid of low viscosity. The electrolysis solution may have various configurations, such as a gel state, a macromolecular type, and a liquid crystal dispersion type. Particularly, the electrolysis solution is preferably formed as a gel state or a solid state, in terms of increasing the element strength, increasing the reliability, and preventing color diffusion. As a solidifying method, the electrolyte and the solvent are preferably held in the polymer resin. This is because high ion conductivity and high solid strength can be attained. Furthermore, the polymer resin is preferably a photo-curable resin. Accordingly, the element can be manufactured at a lower temperature and by a shorter amount of time than by a method in which a thin film is formed by evaporating the solvent.

The electric storage element 6 and the power source 7 are switchably connected to the display electrode 1 and the opposing electrode 2 via the switching element 8. As the switching element 8, a Metal-Oxide Semiconductor Field-Effect Transistor (MOSFET) may be used, although not limited thereto. As the electric storage element 6, for example, a capacitor or a secondary battery may be used. Specifically, examples of the capacitor are a ceramic capacitor, an aluminum electric field capacitor, a tantalum capacitor, and an electric two layer capacitor. Examples of the secondary battery are a lithium ion battery, a nickel metal-hydride battery, a nickel-cadmium battery, an alkaline storage battery, and a lead battery.

In order to quickly switch the display pattern as an application to a display device of an electrochromic display device such as electronic paper, a capacitor which is capable of quick charging and discharging is preferably used. Particularly, in the case of a display device having a large screen, an electric double layer capacitor having a large charging capacity is preferably used. This is because as the size of the electrochromic display element increases, the charge amount required for driving increases. The same applies to photochromic glass and photochromic lenses.

Meanwhile, when pattern switching is not frequently performed, a secondary battery that has low self-discharge and that is capable of saving charges for a long period of time is preferably used.

As the switching element 8, it is possible to use an element having a function of switching the connection between an electrochromic display element 10 and a power source 7 or an electric storage element 6. An analog switch such as FET, a bipolar transistor, a photocoupler, a thyristor, and a solid state relay may be used. The circuit may be formed by combining together a plurality of these elements. When the electrochromic display element is small and a compact circuit is needed, a FET is preferably used. When a relatively large electrochromic display element such as photochromic glass is used, or when the device is for manually switching the pattern such as photochromic glasses using photochromic lenses, a button switch and a slide switch may be used.

Furthermore, the switching element may have a function of connecting a plurality of electric storage elements to a single electrochromic display element, or conversely, function of connecting a plurality of electrochromic display elements to a single electric storage element. This is because there are cases where the electrochromic display element and the electric storage element being used have different capacities, and cases where the efficiency of charging and discharging and the driving speed may be increased by connecting the elements in series or in parallel.

Second Embodiment

Figure 3:
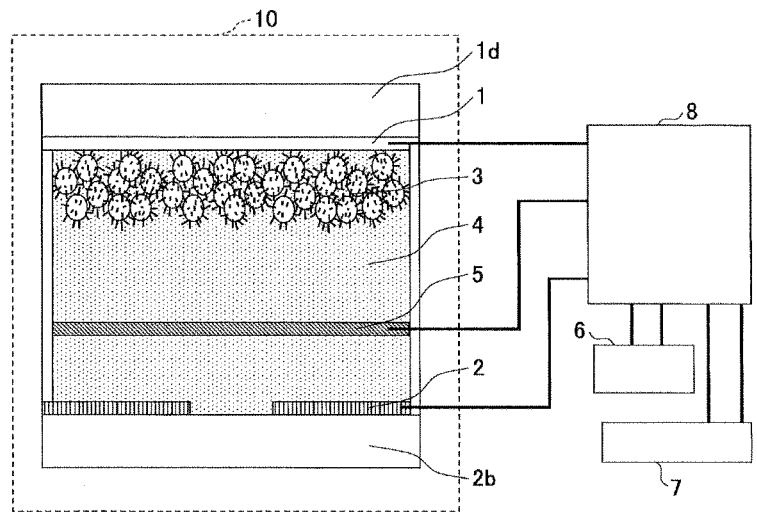
FIG. 3 is a cross-sectional view of a configuration example (2) of an electrochromic display device.

Next, with reference to FIG. 3, a description is given of a second embodiment.

FIG. 3 is a schematic diagram of the electrochromic display device according to the second embodiment. In the following, elements that are the same as those described above are denoted by the same reference numerals, and may not be further described (the same applies to other embodiments below).

A configuration example (2) of an electrochromic display device according to the present embodiment is different from the configuration example (1) of the electrochromic display device according to the first embodiment, in that a recovery electrode 5 as the third electrode is included in an electrochromic display element 10, and the connection state between the electric storage element 6 or the power source 7 and the recovery electrode 5 or the opposing electrode 2 can be switched by using a switching element 8.

In the electrochromic display device, when a pattern is formed on the opposing electrode 2 and the area of the opposing electrode 2 is smaller than that of the display electrode 1 and the electrochromic layer 3, the electric charges diffuse to parts of the electrochromic layer 3 that are not sandwiched between the display electrode 1 and the opposing electrode 2, and colors are formed at these parts.

The color at these parts can be efficiently erased by using the recovery electrode 5 having the same shape as the display electrode or a shape that covers a larger area than the display electrode, or a shape that covers a larger area than the opposing electrode.

In FIG. 3, the recovery electrode 5 is a third electrode, which is disposed between the display electrode 1 and plural opposing electrodes 2, and sandwiches the electrochromic layer 3 with the display electrode 1, and by which a voltage can be applied between the display electrode 1. The location of the recovery electrode 5 is not limited between the display electrode 1 and the opposing electrode 2.

The material of the recovery electrode 5 is not particularly limited as long as the material is conductive. However, as ion permeability is to be secured, an electrode made of a porous material is used. The electrode material is not particularly limited; however, a porous film such as metal, ITO, FTO, and ATO; particles such as metal, ITO, FTO, and ATO; and a network electrode such as metal nanowire and carbon nanowire, are preferably used. Furthermore, when light permeability needs to be secured, a transparent electrode made of a transparent material similar to the display electrode 1 is preferably used.

At least one of the display electrode 1, the opposing electrode 2, and the recovery electrode 5 acting as the third electrode preferably has ion permeability.

Third Embodiment

Figure 4:
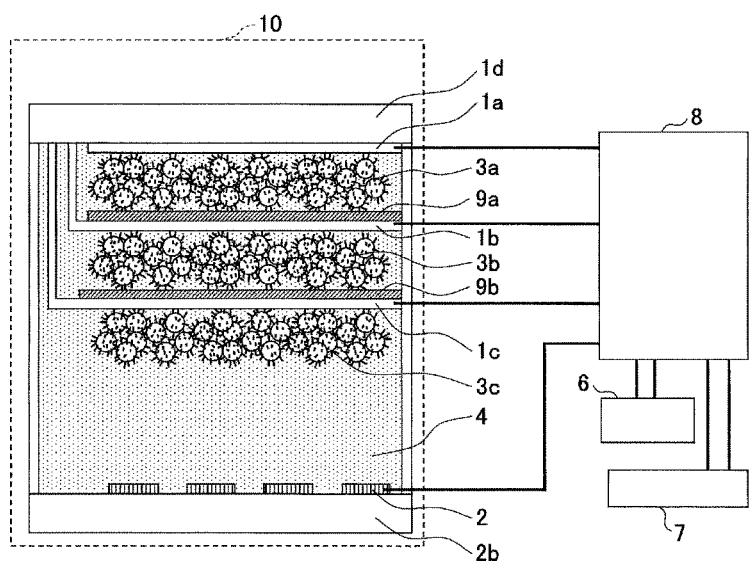
FIG. 4 is a cross-sectional view of a configuration example (3) of an electrochromic display device.

Next, with reference to FIG. 4, a description is given of a third embodiment.

FIG. 4 is a schematic diagram of the electrochromic display device according to the third embodiment. In the following, elements that are the same as those described above are denoted by the same reference numerals, and may not be further described (the same applies to other embodiments below).

A configuration example (3) of an electrochromic display device according to the present embodiment is different from the configuration example (1) of the electrochromic display device according to the first embodiment, in that in an electrochromic display element 10, three layers of each of the display electrode and an electrochromic layer provided in contact with the display electrode are laminated, and the electrochromic layer for causing color forming/erasing driving and the relevant display electrode can be switched by a switching element 8.

That is to say, a first electrochromic layer 3a and a first display electrode 1a, a second electrochromic layer 3b and a second display electrode 1b, and a third electrochromic layer 3c and a third display electrode 1c corresponding to three colors are provided, and the color forming/erasing driving can be switched among these by the switching element 8. In other words, the electrochromic display device has a layer structure including plural pairs (three pairs in the example of FIG. 4) of display electrodes and electrochromic layers, and the pairs are electrically isolated from each other.

Fourth Embodiment

Figure 5:
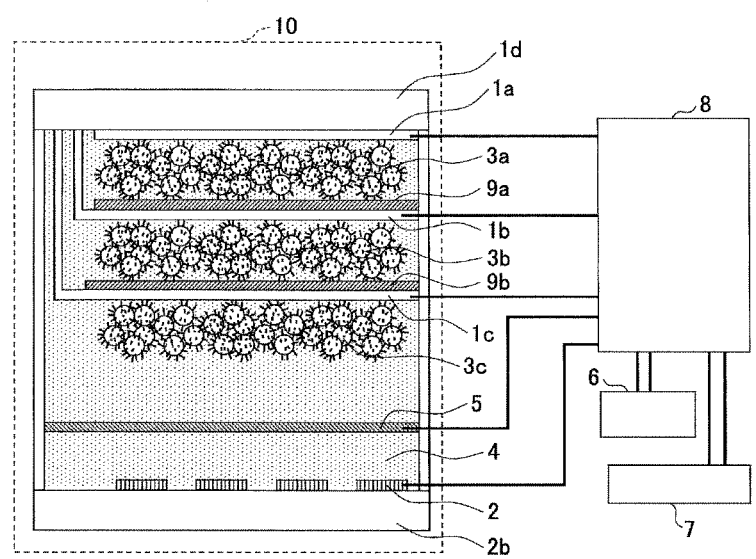
FIG. 5 is a cross-sectional view of a configuration example (4) of an electrochromic display device.

Next, with reference to FIG. 5, a description is given of a fourth embodiment.

FIG. 5 is a schematic diagram of the electrochromic display device according to the fourth embodiment. In the following, elements that are the same as those described above are denoted by the same reference numerals, and may not be further described (the same applies to other embodiments below).

A configuration example (4) of an electrochromic display device according to the present embodiment is different from the configuration example (3) of the electrochromic display device according to the second embodiment, in that the recovery electrode 5 is provided in an electrochromic display element 10, and the connection state between the electric storage element 6 or the power source 7 and the recovery electrode 5 or the opposing electrode 2 can be switched by using the switching element 8.

Driving Method

Figure 6:
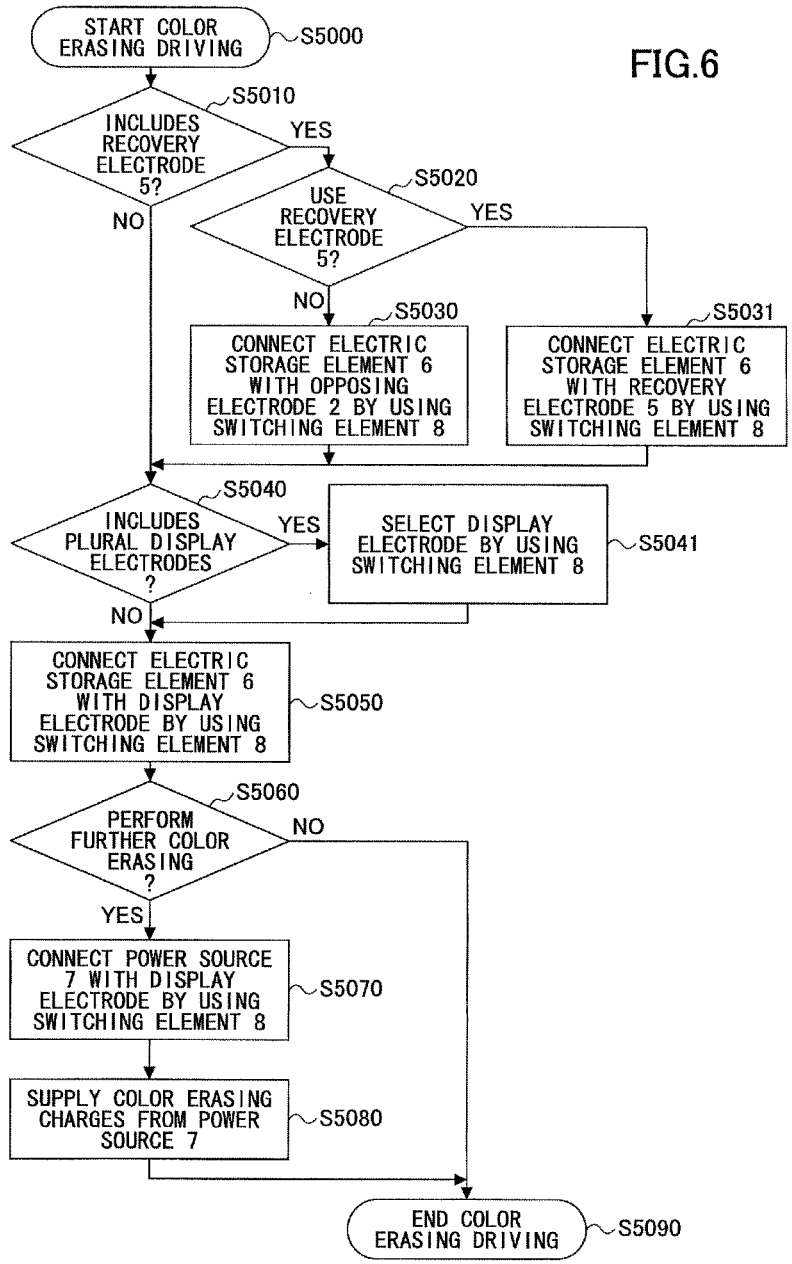
FIG. 6 is a flowchart of an operation of a switching element when performing color erasing driving in an electrochromic display device according to an embodiment of the present invention.
Figure 7:
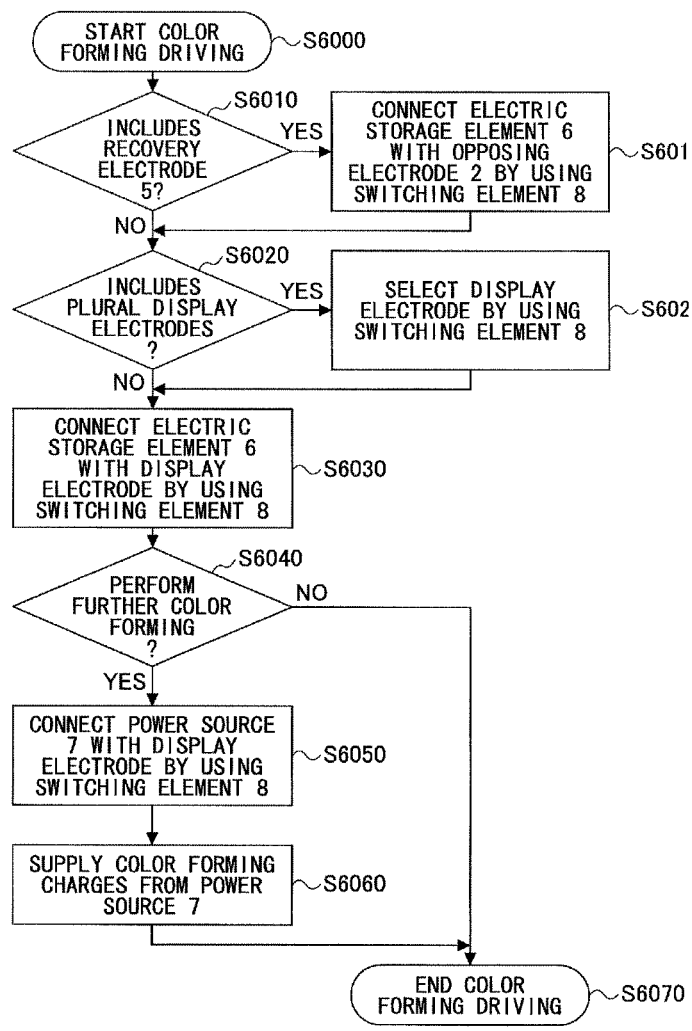
FIG. 7 is a flowchart of an operation of a switching element when performing color forming driving in an electrochromic display device according to an embodiment of the present invention.

A description is given of a driving method of the electrochromic display device according to embodiments of the present invention. Operations during driving of the switching element 8 described in the above embodiments are collectively indicated in flowcharts of FIGS. 6 and 7. FIGS. 6 and 7 respectively correspond to color erasing driving and color forming driving in an electrochromic display element, which becomes a color erasing state in a discharging state and a color forming state in a charging state. In the following, unless otherwise indicated, it is assumed that the electrochromic display element operates in the same manner as this example. However, embodiments of the present invention are also applicable when the color erasing state and the color forming state are switched, i.e., the electrochromic display element becomes a color erasing state in a charging state and a color forming state in a discharging state.

A description is given of a color forming/erasing driving method according to the first embodiment.

The color erasing driving method of the configuration example (1) of the electrochromic display device according to an embodiment of the present invention is described with reference to FIG. 2 and the flowchart of FIG. 8.

Figure 8:
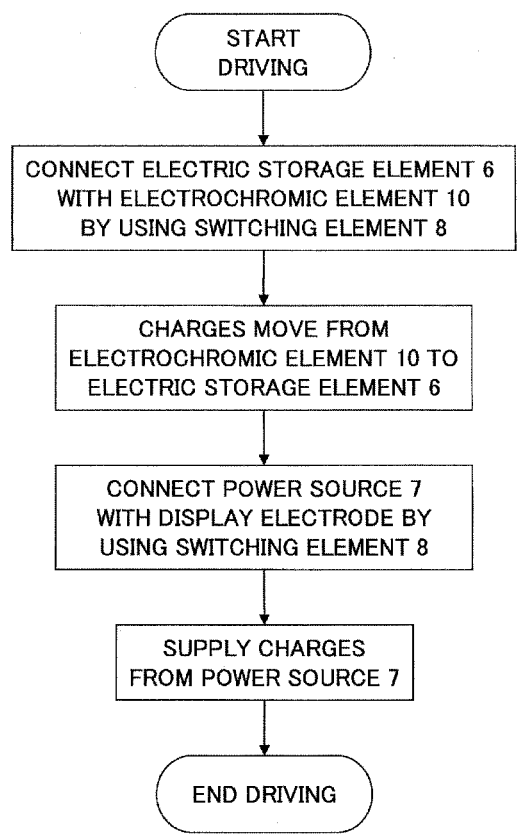
FIG. 8 is a flowchart of a method performed when the charges stored in the electrochromic display element are applied for charging the electric storage element when driving is performed by the configuration example (1) of the electrochromic display device according to an embodiment of the present invention.

FIG. 8 is a flowchart of a method performed when the charges stored in the electrochromic display element 10 in the color forming state are applied for charging the electric storage element 6, when discharging by color erasing driving. The electrochromic display element 10 in the color forming state in which charges are stored, is connected to the electric storage element 6 that is not charged, by a switching element 8. While the connection is maintained, the current flows, and the electric storage element 6 is charged.

Subsequently, the connection of the electrochromic display element 10 and the electric storage element 6 is disconnected by using the switching element 8. The timing of disconnecting the connection may be determined by (a) the elapsed time from the connection, or by (b) the current value generated between the electrochromic display element 10 and the electric storage element 6, or by (c) the voltage value generated between the electrochromic display element 10 and the electric storage element 6, or by (d) the color density of the electrochromic display element 10. Any one of these means may be used for the determination. Subsequently, when the electrochromic display device is further driven to a desired color by using a power source, the switching element 8 is used to connect the electrochromic display element 10 and the power source, charges of the electrochromic display element 10 are removed, and color erasing driving is performed. After driving to a predetermined density, the switching element 8 is used to disconnect the electrochromic display element 10 from the power source, and the driving ends.

Next, operations of the switching element 8 during color erasing driving of the configuration example (1) of the electrochromic display device according to an embodiment of the present invention is described with reference to FIG. 2 and the flowchart of FIG. 6.

The electrochromic display element 10 that is in a color-formed state does not have the recovery electrode 5 and only has the display electrode 1 as a display electrode. Therefore, in step S5050, the electric storage element 6 is connected with the display electrode 1 and the opposing electrode 2 by the switching element 8. At this time, part of the electric charges, which are held in the electrochromic layer 3, flow as color erasing charges by the difference in potential between the display electrode 1 and the opposing electrode 2, and the color is erased to a certain color density. At the same time, electric charges are stored in the electric storage element 6.

Subsequently, in step S5060, when the color is to be further erased to the desired color density, in step S5070, the switching element 8 is used to separate the electric storage element 6 from the display electrode 1, and to connect the power source 7 and the display electrode 1. Subsequently, in step S5080, color erasing charges are applied from the power source 7 so that the color is erased to the desired color density, and the color erasing driving is ended (step S5090).

In step S5060, when the color is not to be further erased to the desired color density, the color erasing driving is ended immediately (step S5090).

The color forming driving method of the configuration example (1) of the electrochromic display device according to an embodiment of the present invention is described with reference to FIG. 2 and the flowchart of FIG. 9.

Figure 9:
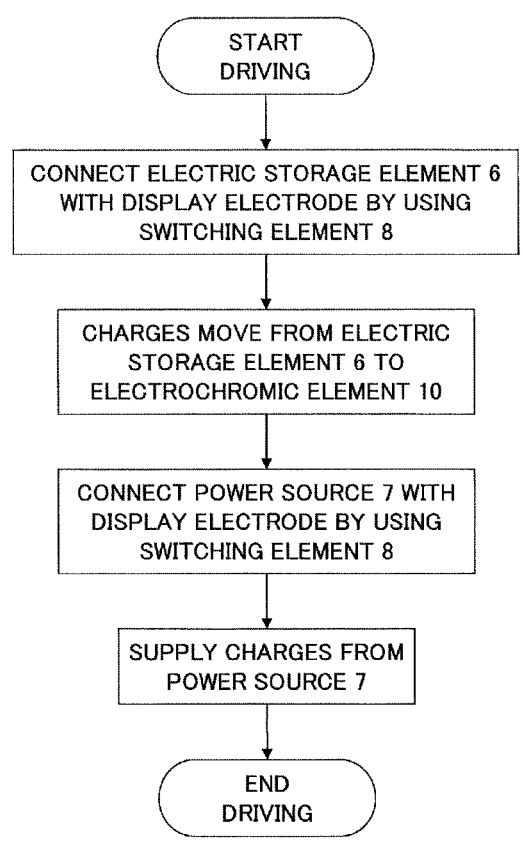
FIG. 9 is a flowchart of a method performed when the charges stored in the electric storage element are applied for charging the electrochromic display element when driving is performed by the configuration example (1) of the electrochromic display device according to an embodiment of the present invention.

FIG. 9 is a flowchart of a method performed when the charges stored in the electric storage element 6 are injected to the electrochromic display element 10. The electrochromic display element 10 in the color erasing state in which charges not stored, is connected to the electric storage element 6 that is charged, by a switching element 8. While the connection is maintained, the current flows, charges are injected to the electrochromic display element 10. Subsequently, the connection of the electrochromic display element 10 and the electric storage element 6 is disconnected by using the switching element 8. Subsequently, when the electrochromic display device is further driven to a desired color by using a power source 7, the switching element 8 is used to connect the electrochromic display element 10 and the power source 7, charges are injected in the electrochromic display element 10, and color forming driving is performed. After driving to a predetermined density, the switching element 8 is used to disconnect the electrochromic display element 10 from the power source 7, and the driving ends.

Next, operations of the switching element 8 during color forming driving of the configuration example (1) of the electrochromic display device according to an embodiment of the present invention is described with reference to FIG. 2 and the flowchart of FIG. 7.

The electrochromic display element 10 that is in a color erased state does not have the recovery electrode 5 and only has the display electrode 1 as a display electrode. Therefore, in step S6030, the electric storage element 6, which has been charged at the time of color erasing driving, is connected to the display electrode 1 by the switching element 8. Accordingly, a part of the electric charges stored in the electric storage element 6 is supplied in the electrochromic layer 3, and color forming is performed to a certain color density.

Subsequently, in step S6040, when the color is to be further formed to the desired color density, in step S6050, the switching element 8 is used to separate the electric storage element 6 from the display electrode 1, and to connect the power source 7 and the display electrode 1. Subsequently, in step S6060, color forming charges are applied from the power source 7 so that the color is formed to the desired color density, and the color forming driving is ended (step S6070).

In step S6040, when the color is not to be further formed to the desired color density, the color forming driving is ended immediately (step S6070).

Color Forming/Erasing Operation of Configuration Example (2)

Next, a description is given of a color forming/erasing driving method according to configuration example (2).

Figure 10:
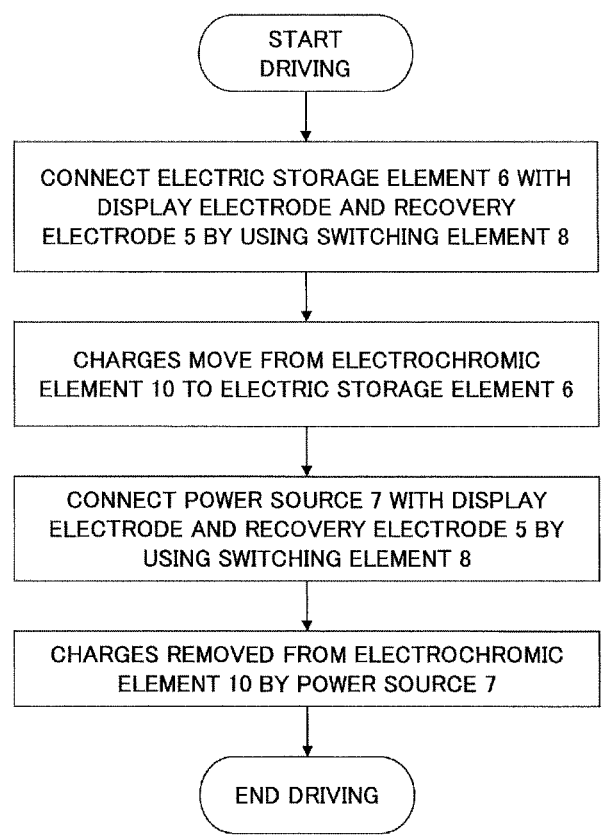
FIG. 10 is a flowchart of a method performed when the charges stored in the electrochromic display element are applied for charging the electric storage element when driving is performed by the configuration example (2) of the electrochromic display device according to an embodiment of the present invention.

The color erasing driving method of the configuration example (2) of the electrochromic display device according to an embodiment of the present invention is described with reference to FIG. 3 and the flowchart of FIG. 10.

The color erasing driving method of the present embodiment is different from the first embodiment in that when the electrochromic display element 10 is connected to the electric storage element 6 or the power source 7 via the switching element 8, the display electrode 1 and the recovery electrode 5 are used. Operations of the switching element 8 at the time of color erasing driving method according to the present configuration is described with reference to FIG. 3 and the flowchart of FIG. 6. Unlike the first embodiment, in the present configuration, the recovery electrode 5 is provided; however, when color erasing driving is performed without using the recovery electrode 5 in step S5010, in step S5030, the switching element 8 is used to connect the electric storage element 6 and the opposing electrode 2. From step S5040 and onward, the same driving as that of the color erasing driving according to the first embodiment is to be performed.

When color erasing driving is to be performed with the use of the recovery electrode 5, in step S5031, the switching element 8 is used to connect the electric storage element 6 and the recovery electrode 5. From step S5040 and onward, the same driving as that of the color erasing driving according to the first embodiment is to be performed.

By performing color erasing driving with the use of the recovery electrode 5 in the present configuration, for example, the color erasing driving method according to an embodiment of the present invention may be easily realized with the use of opposing electrodes of complex shapes, for example, with an electrode formed on a driving device according to plural thin film transistors (TFT) separately formed on opposing electrodes.

Furthermore, when charges are to be stored in the opposing electrode, charges may be recovered by performing the above driving process on the opposing electrode.

Figure 11:
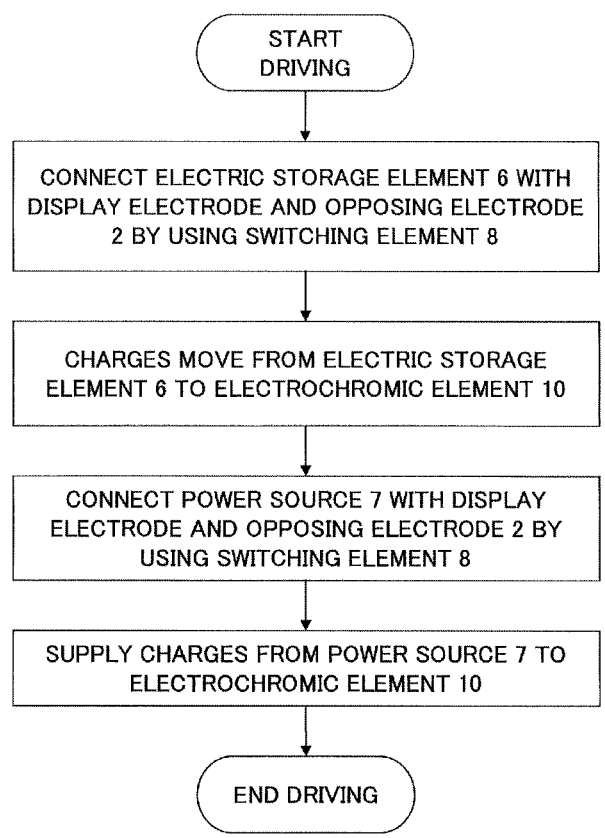
FIG. 11 is a flowchart of a method performed when the charges stored in the electric storage element are applied for charging the electrochromic display element when driving is performed by the configuration example (2) of the electrochromic display device according to an embodiment of the present invention.

The color forming driving method of the configuration example (2) of the electrochromic display device according to an embodiment of the present invention is described with reference to FIG. 3 and the flowchart of FIG. 11. The color forming driving of the present configuration may be the same as the driving of the first embodiment.

Operations of the switching element 8 at the time of color forming driving method according to the present configuration example is described with reference to FIG. 3 and the flowchart of FIG. 7. Unlike the first embodiment, in the present configuration, the recovery electrode 5 is provided in step S6010, and therefore in step S6011, the switching element 8 is used to connect the electric storage element 6 and the opposing electrode 2. From step S6020 and onward, the same driving as that of the color forming driving according to the first embodiment is to be performed.

Color Forming/Erasing Operation According to Third Embodiment

Next, a description is given of a color forming/erasing driving method according to the third embodiment.

Figure 12:
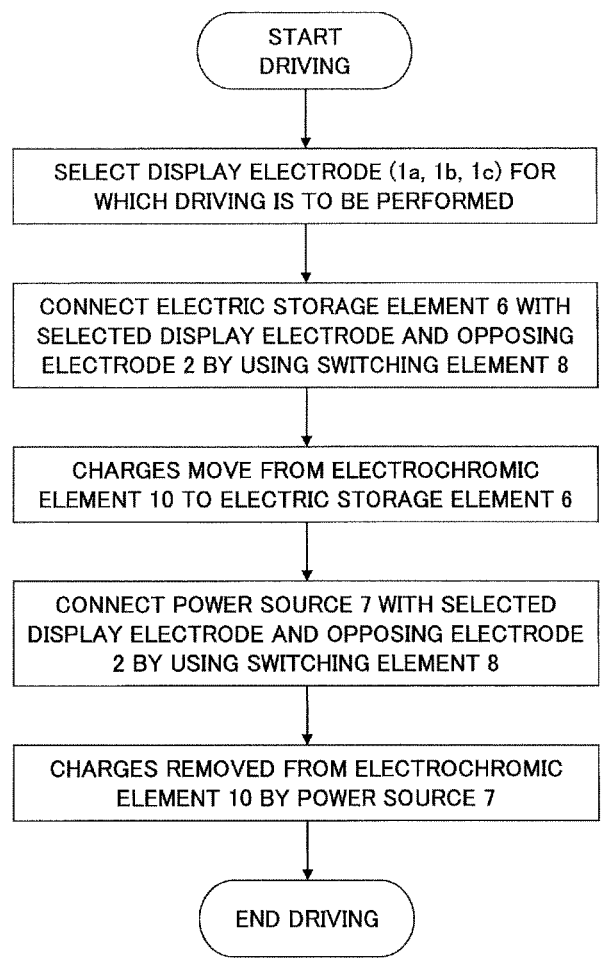
FIG. 12 is a flowchart of a method performed when the charges stored in the electrochromic display element are applied for charging the electric storage element when driving is performed by the configuration example (3) of the electrochromic display device according to an embodiment of the present invention.

The color forming erasing method of the configuration example (3) of the electrochromic display device according to an embodiment of the present invention is described with reference to FIG. 4 and the flowchart of FIG. 12.

Operations of the switching element 8 at the time of the color erasing driving method according to the second embodiment is described with reference to FIG. 4 and the flowchart of FIG. 6. The driving method from step S5040 and onward in the present configuration is the same as the first embodiment. However, in the present configuration, plural display electrodes 1*a*, 1*b*, and 1*c* are included, and therefore in step S5041, the switching element 8 is used to select one of the display electrodes 1*a*, 1*b*, and 1*c* in contact with the electrochromic layer in which the color has been erased. From step S5050 and onward, the same color erasing driving as that of the first embodiment is performed, and the color erasing driving is ended.

By performing this driving for each of the electrochromic layers, it is possible to realize color erasing driving for a multicolor display state.

Figure 13:
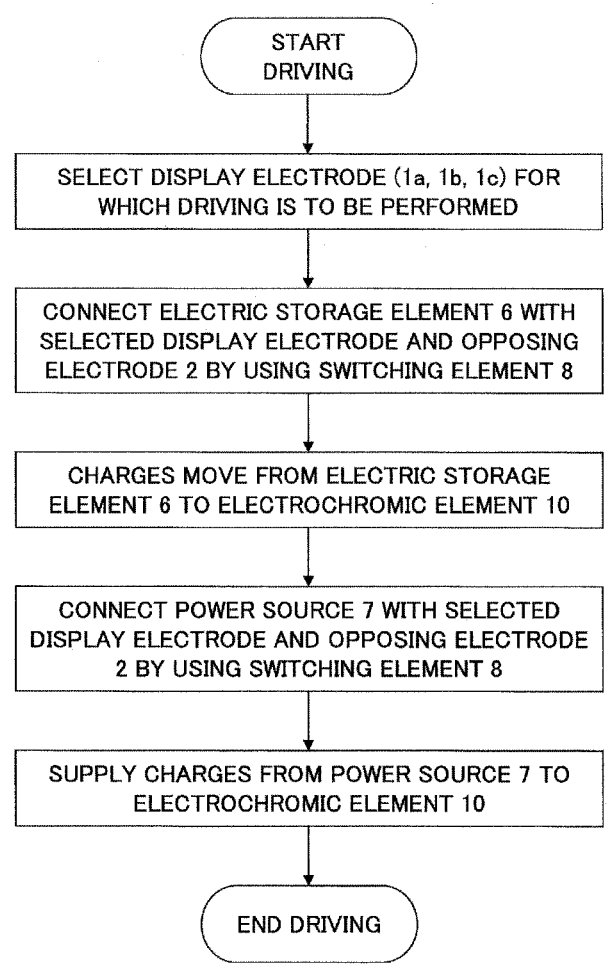
FIG. 13 is a flowchart of a method performed when the charges stored in the electric storage element are applied for charging the electrochromic display element when driving is performed by the configuration example (3) of the electrochromic display device according to an embodiment of the present invention.

The color forming driving method of the configuration example (3) of the electrochromic display device according to an embodiment of the present invention is described with reference to FIG. 4 and the flowchart of FIG. 13. In the color forming driving of the present configuration, similar to the color erasing driving, first, the display electrode and electrochromic layer for which color forming driving is to be performed are selected, and the same driving as that of the first embodiment is to be performed.

Next, operations of the switching element 8 at the time of the color forming driving according to the second embodiment is described with reference to FIG. 4 and the flowchart of FIG. 7. The driving method from step S6020 and onward in the present embodiment is the same as the first embodiment. However, in the present embodiment, plural display electrodes 1*a*, 1*b*, and 1*c* are included, and therefore in step S6021, the switching element 8 is used to select one of the display electrodes 1*a*, 1*b*, and 1*c* in contact with the electrochromic layer in which the color is to be formed. From step S6030 and onward, the same color forming driving as that of the first embodiment is performed, and the color forming driving is ended.

By performing this driving for each of the electrochromic layers, it is possible to realize multicolor display driving.

Color Forming/Erasing Operation of Fourth Embodiment

Figure 14:
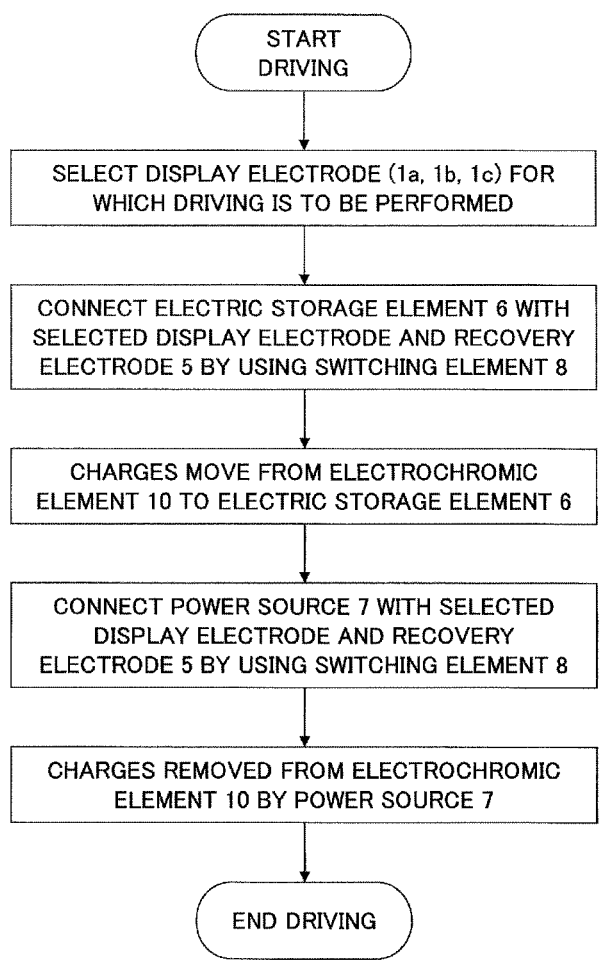
FIG. 14 is a flowchart of a method performed when the charges stored in the electrochromic display element are applied for charging the electric storage element when driving is performed by the configuration example (4) of the electrochromic display device according to an embodiment of the present invention.

The color erasing driving method of the configuration example (4) of the electrochromic display device according to an embodiment of the present invention is described with reference to FIG. 5 and the flowchart of FIG. 14.

In the present configuration, a plurality of display electrodes and recovery electrodes 5 are included, and therefore, first, similar to the third embodiment, the display electrode and electrochromic layer for which color erasing driving is to be performed are selected, and subsequently, similar to the second embodiment, the display electrode and the recovery electrode 5 are used to connect the electrochromic display element 10 and the electric storage element 6 or the power source 7 via the switching element 8.

Operations of the switching element 8 at the time of the color erasing driving according to the present embodiment is described with reference to FIG. 5 and the flowchart of FIG. 6. The driving method up to step S5040 in the present embodiment is the same as the first embodiment. The driving method of step S5040 and onward is the same as the color erasing driving as the second embodiment, and the color erasing driving is ended.

Figure 15:
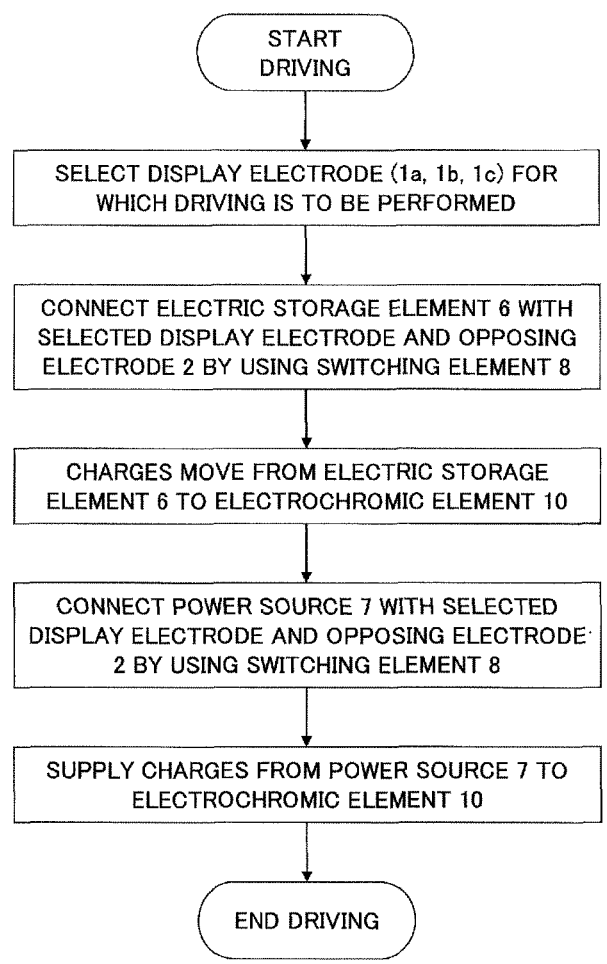
FIG. 15 is a flowchart of a method performed when the charges stored in the electric storage element are applied for charging the electrochromic display element when driving is performed by the configuration example (4) of the electrochromic display device according to an embodiment of the present invention.

The color forming driving method of the configuration example (4) of the electrochromic display device according to an embodiment of the present invention is described with reference to FIG. 5 and the flowchart of FIG. 15. In the color forming driving of the present embodiment, similar to the color erasing driving, first, the display electrode and electrochromic layer for which color forming driving is to be performed are selected, and the same driving as that of the first embodiment is to be performed.

Next, operations of the switching element 8 at the time of the color forming driving according to the present embodiment is described with reference to FIG. 5 and the flowchart of FIG. 7. The driving method up to step S6020 in the present embodiment is the same as the first embodiment. The driving method of step S6020 and onward is the same as the color forming driving as the second embodiment, and the color forming driving is ended.

The electrochromic display device described above performs the following driving method.

When driving the electrochromic display device, a switching element 8 is used to connect the electric storage element 6 to the display electrode, the opposing electrode 2, or the recovery electrode 5. The electrochromic layer 3, the opposing electrode 2, or the recovery electrode 5 is oxidized or reduced, and at least part of the electric charges flowing at the time of driving is applied to the charging of the electric storage element 6.

Oxidizing or reducing is not limited to exchanging electric charges; but is also limited to exchanging oxygen, hydrogen, and ion.

After applying the electric charges to the charging of the electric storage element 6, next, switching element 8 is used to connect the power source 7 (instead of the electric storage element 6) to the display electrode, the opposing electrode 2, or the recovery electrode 5. The power source 7 is used to further oxidize or reduce the electrochromic layer 3, the opposing electrode 2, or the recovery electrode 5.

Furthermore, when driving the electrochromic display device, a switching element 8 is used to connect the electric storage element 6 that has been charged to the display electrode, the opposing electrode 2, or the recovery electrode 5. This electric storage element 6 may be used to oxidize or reduce the electrochromic layer 3, the opposing electrode 2, or the recovery electrode 5.

After oxidation or reduction, next, switching element 8 is used to connect the power source 7 (instead of the electric storage element 6) to the display electrode, the opposing electrode 2, or the recovery electrode 5. The power source 7 is used to further oxidize or reduce the electrochromic layer 3, the opposing electrode 2, or the recovery electrode 5.

By appropriately connecting the elements of the electrochromic display device and the power source by using the switching element, the electrochromic display element can be efficiently driven, and the electric storage element can be efficiently charged. Therefore, the amount of electric charges from outside can be reduced, and stable color forming/erasing can be attained.

EXAMPLES

Next, examples of an embodiment of the present invention are described.

Example 1

Fabrication of Electrochromic Display Element 10

(1) Preparation of Electrolyte Layer Precursor Material

As electrolyte, a propylene carbonate solution of tetrabutylammonium perchlorate (TBAP, density 2 mol/l) was prepared. Next, as the electrolyte layer precursor material, a liquid crystal composition for PNLC manufactured by DIC corporation, a monomer composition, and a mixture of polymeric initiators (product name: PNM-170), were mixed with the above electrolyte. At this time, this solution was adjusted so that the TRAP density became approximately 0.04 mol/l. Furthermore, to define the layer thickness of the electrolyte layer 4 to be fabricated, spherical resin beads having a particle size of 10 μm were dispersed in the electrolyte layer precursor material by a density of 0.2 wt %.

(2) Fabrication of Display Electrode 1, Electrochromic Layer 3

On the entire surface of a glass substrate (display substrate 1*d*) of 40 mm×40 mm, an ITO film having a thickness of 100 nm was formed by a sputtering method, to fabricate the display electrode 1. The resistance between electrode end parts was approximately 200Ω. On top of this, a titanium oxide nano particle dispersion liquid (product name: SP210, manufactured by Shows Titanium K.K.) was spin-coated, and an annealing process was performed for 15 minutes at 120° C. to form a titanium oxide particle film. Furthermore, on top of this, 1 wt % of 4,4'-(isooxazole-3,5-diyl) bis(1-(2-phosphonoethyl) pyridinium) bromide which is an electrochromic compound, a 2,2,3,3-Tetrafluoroproppano (hereinafter, "TFP") solution was spin-coated, and an annealing process was performed for 10 minutes at 120° C., to form the electrochromic layer 3 constituted by titanium oxide particles and an electrochromic compound. Furthermore, on top of this, an ITO film having a thickness of 100 nm was formed by a sputtering method, and the recovery electrode 5 was fabricated.

(3) Fabrication of Opposing Electrode 2

On the surface of a glass substrate (opposing substrate 2*b*) of 40 mm×40 mm, an ITO film having a thickness of 10 nm was formed in stripes, thereby forming the opposing electrode 2.

(4) Fabrication of Electrochromic Display Element 10

On the display electrode 1 and the electrochromic layer 3 fabricated at (2), the electrolyte layer precursor material prepared at (1) was applied. Next, the opposing electrode 2 and the erasing electrode 5 fabricated at (3) were superposed on each other, and an ultraviolet ray (radiating light intensity 50 mW/cm$^2$) having a center wavelength of 365 nm was radiated from a high-pressure mercury lamp from the side of the opposing electrode 2 for two minutes, and photopolymerization phase separation was performed, to fabricate the electrochromic display element 10 via the electrolyte layer 4. The area where the display electrode 1 and the opposing electrode 2 overlap was approximately 3 cm$^2$.

Figure 16:
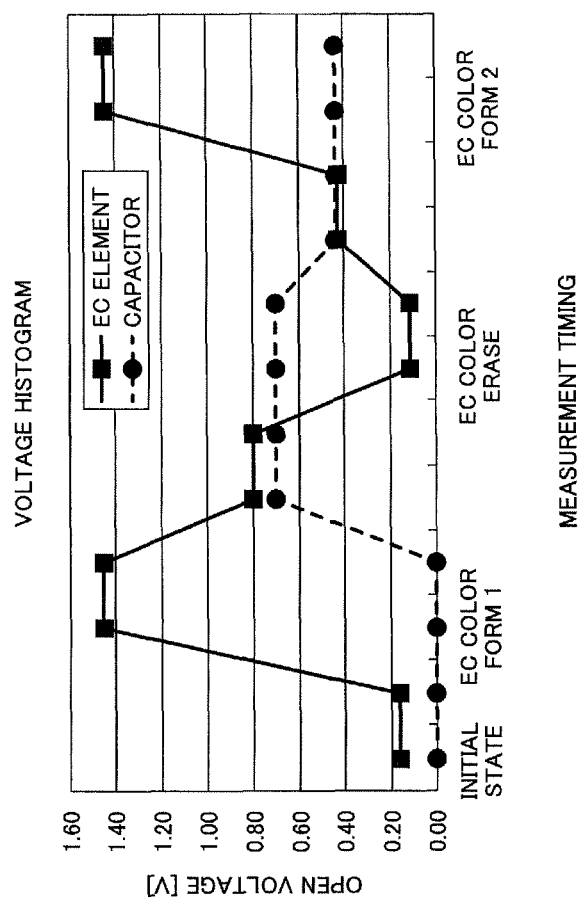
FIG. 16 is a histogram of the open voltage between electrodes at the time of the color forming/erasing operation.

The electrochromic display element 10 fabricated in (4) was used to confirm the recovering and the reusing of electric charges at the time of color forming/erasing. FIG. 16 is a histogram of the open voltage between electrodes measured at the time of the color forming/erasing operation.

Confirmation of Electric Charge Recovery when Rewriting

The negative electrode and the positive electrode of the power source 7 were respectively connected, via a switching element 8 and a switching element 8*b*, to the display electrode 1 side and the opposing electrode 2 side of the electrochromic display element 10 fabricated in (4). In the present example, the switching element is fabricated by combining a plurality of knife switches. Electric charges of 2.5 mC were supplied from the power source 7 to the electrochromic display element 10. As a result, the electrochromic layer 3 formed a blue color in accordance with the shape of the ITO stripe pattern opposing electrode 2 (color-formed state 1). At this time, between the display electrode 1 side and the opposing electrode 2 side of the electrochromic display element 10, an open voltage of 1.45 V was confirmed.

Next, the positive electrode and the negative electrode of an aluminum electrolysis capacitor having a capacitance of 1 mF acting as the electric storage element 6 were respectively connected to the display electrode 1 side and the opposing electrode 2 side via the switching element 8. Then, between the display electrode 1 side and the opposing electrode 2 side of the electrochromic display element 10, an open voltage of 0.8 V was confirmed. Furthermore, between the positive electrode and the negative electrode of the electric storage element 6, an open voltage of 0.7 V was confirmed. Accordingly, it was confirmed that part of the electric charges carried in the electrochromic layer 3 were charged in the electric storage element 6.

Confirmation of Reusing of Recovered Charges when Rewriting (1) Next, the positive electrode and the negative electrode of the power source 7 were respectively connected, via the switching element 8, to the display electrode 1 side and the opposing electrode 2 side of the electrochromic display element 10 in the color-formed state 1, and electric charges were supplied to erase the color of the electrochromic display element 10. At the time point when the amount of supplied electric charges reached 1.5 mC, it was confirmed that the color has been erased to the same level as the initial state (color-erased state). At this time, the open voltage between the display electrode 1 side and the opposing electrode 2 side of the electrochromic display element 10 was 0.11 V.

(2) Next, the display electrode 1 side and the opposing electrode 2 side of the electrochromic display element 10 whose color has been completely erased at (1) were respectively connected, by the switching element 8, to the positive electrode and the negative electrode of the electric storage element 6 in which electric charges have been recovered. Accordingly, an open voltage of 0.42 V was confirmed between the display electrode 1 side and the opposing electrode 2 side of the electrochromic display element 10. At this time, an open voltage of 0.43 V was confirmed between the positive electrode and the negative electrode of the electric storage element 6. Accordingly, it was confirmed that part of the electric charges charged in the electric storage element 6 has moved to the electrochromic display element 10.

Confirmation of Reusing of Recovered Charges when Rewriting

The negative electrode and the positive electrode of the power source 7 were respectively connected, via a switching element 8, to the display electrode 1 side and the opposing electrode 2 side of the electrochromic display element 10 to which electric charges have been supplied from the electric storage element 6 as described above, and electric charges were supplied. At the time point when the of amount supplied electric charges reached approximately 2.2 mC, a color was formed to approximately the same density as the color-formed state 1 (color-formed state 2). At this time, an open voltage of 1.45 V was confirmed between the display electrode 1 and the opposing electrode 2 of the electrochromic display element 10.

Figure 17:
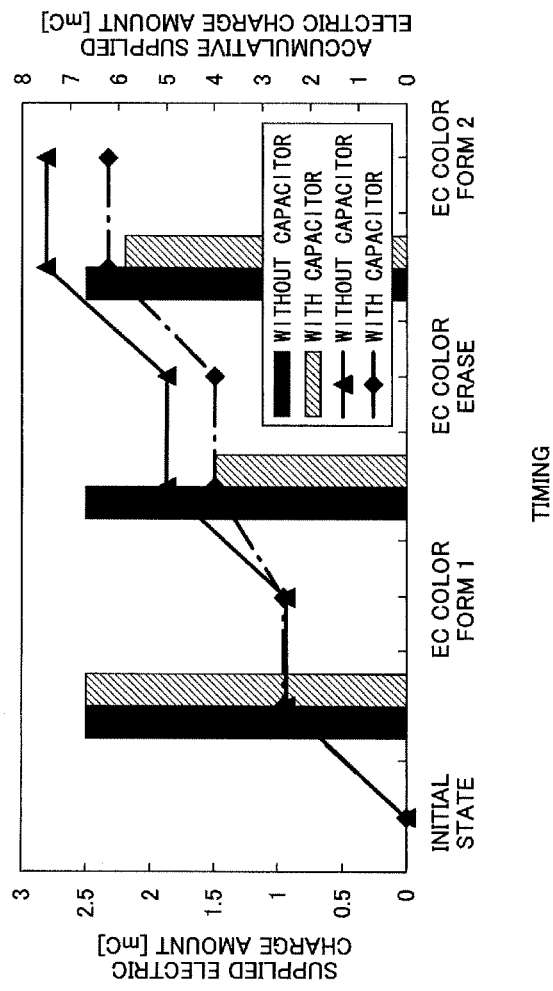
FIG. 17 is a histogram of the amount of electric charges supplied from a power source and the accumulative electric charge amount at the time of the color forming/erasing operation in cases where an electric storage element is provided/not provided.

The electric charge amount supplied from the power source 7 by the above operation is indicated in the histogram of FIG. 17. In one cycle in which the state changes from the initial color-formed state to the color-erased state and then back to the color-formed state (color-formed state 1→color-erased state→color-formed state 2), the amount of electric charges supplied from the power source 7 was approximately 3.7 mC.

Meanwhile, when this operation of one cycle was performed without using the electric storage element 6 and the driving method according to an embodiment of the present invention, and the color erasing electric charges and color forming electric charges were all supplied from the power source 7, the electric charge amount supplied from the power source 7 was 5.0 mC in one cycle.

Accordingly, it was found that the electric charge amount supplied to the electrochromic display element 10 is 26% less than that in the case of the conventional technology.

Furthermore, as an example of large size electrochromic display device, an electrochromic display element was fabricated on a glass substrate of 160 mm×160 mm, so that the area overlapping the opposing electrode was 225 cm². An electric double layer capacitor having a nominal capacity of 350 mF was used as the electric storage element. The same driving as described above was performed on this electrochromic display device. The electric charge amount supplied to the electrochromic display element 10 was approximately 20% less than that in the case of the conventional technology. Therefore, the present invention was found to be applicable regardless of the size of the electrochromic display element.

Furthermore, in the case of this electrochromic display element 10, the amount of electric charges supplied in one cycle of the color forming/erasing driving is approximately 55 mC less, so that the electric charge recovery amount per cycle is greater than the case of a small size element. Accordingly, for an electrochromic display element having a larger size or a larger capacity, when the power is consumed at the switching element 8, for example, even if a charging IC (e.g., Texas Instruments bq25504) is used as the switching element, the electric charge recovery amount can be increased with respect to the power consumption of the circuit, which increases the usage efficiency.

Furthermore, the same effects can be attained by the electrochromic display element 10 according to the second, third, and fourth embodiments.

According to one embodiment of the present invention, an electrochromic display device is provided, which is capable of suppressing the amount of electric charges supplied from a power source when switching between color forming and erasing in the electrochromic display device, with a simple configuration.

The electrochromic display device is not limited to the specific embodiments described herein, and variations and modifications may be made without departing from the scope of the present invention.

The present application is based on and claims the benefit of priority of Japanese Priority Patent Application No. 2012-109410, filed on May 11, 2012, and Japanese Priority Patent Application No. 2013-96912, filed on May 2, 2013, the entire contents of which are hereby incorporated herein by reference.

What is claimed is:

1. An electrochromic display device comprising:
an electrochromic display element including
a display electrode,
an electrochromic layer provided on the display electrode,
an opposing electrode facing the display electrode, and
an electrolyte layer sandwiched between the display electrode and the opposing electrode, the electrochromic display device further including
a switching element, and
a electric storage element, wherein
the display electrode is connected with the opposing electrode by a power source or the electric storage element via the switching element, and
when performing driving, part of electric charges, which are stored in the electrochromic display element, are applied for charging the electric storage element, or electric charges in the electric storage element that has been charged are used for driving the electrochromic display element.

2. The electrochromic display device according to claim 1, wherein
when performing the driving, power of the power source is further applied for the driving.

3. The electrochromic display device according to claim 1, further comprising:
a third electrode facing the display electrode via the electrolyte layer, wherein
the opposing electrode or the third electrode is connected by the power source or the electric storage element via the switching element.

4. The electrochromic display device according to claim 1, wherein
the electrochromic display device has a layer structure including a plurality of pairs of the display electrodes and the electrochromic layers, and the plurality of pairs of the display electrodes and the electrochromic layers are electrically isolated from each other.

5. The electrochromic display device according to claim 3, wherein
at least one of the display electrode, the opposing electrode, and the third electrode has ion permeability.

6. The electrochromic display device according to claim 1, wherein a plurality of the opposing electrodes are provided, and each of the plurality of the opposing electrodes is connected to the power source or the electric storage element via the switching element.

7. The electrochromic display device according to claim 3, wherein
when performing the driving, the display electrode is connected with the opposing electrode or the third electrode by the electric storage element via the switching element, the electrochromic layer or the opposing electrode or the third electrode is oxidized or reduced, and when performing the driving, at least part of the electric charges flowing is applied for charging the electric storage element.

8. The electrochromic display device according to claim 3, wherein
when performing the driving, the display electrode is connected with the opposing electrode or the third electrode by the electric storage element via the switching element, the electrochromic layer or the opposing electrode or the third electrode is oxidized or reduced, and when performing the driving, at least part of the electric charges flowing is applied for charging the electric storage element, and
subsequently, the display electrode is connected with the opposing electrode or the third electrode by the power source instead of by the electric storage element via the switching element, and the power source is used to further oxidize or reduce the electrochromic layer, the opposing electrode, and the third electrode.

9. The electrochromic display device according to claim 3, wherein
when performing the driving, the display electrode is connected with the opposing electrode or the third electrode by the electric storage element that has been charged via the switching element, and the electric storage element is used to oxidize or reduce the electrochromic layer or the opposing electrode or the third electrode.

10. The electrochromic display device according to claim 3, wherein
when performing the driving, the display electrode is connected with the opposing electrode or the third electrode by the electric storage element that has been charged via the switching element, and the electric storage element is used to oxidize or reduce the electrochromic layer or the opposing electrode or the third electrode, and
subsequently, the display electrode is connected with the opposing electrode or the third electrode by the power source instead of by the electric storage element with the use of the switching element, and the power source is used to further oxidize or reduce the electrochromic layer, the opposing electrode, and the third electrode.

* * * * *